United States Patent Office 3,551,195
Patented Dec. 29, 1970

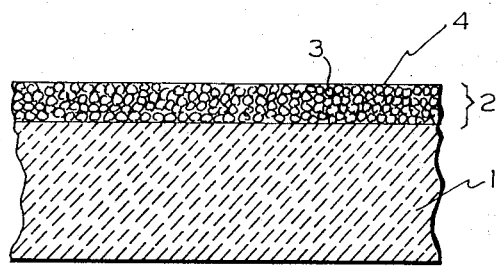

3,551,195
RESISTOR COMPOSITION AND ARTICLE
Mitsuo Wada and Yoshio Iida, Osaka, Japan, assignors to Matsushita Electric Industrial Co., Ltd., Osaka, Japan
Filed Sept. 5, 1968, Ser. No. 757,642
Int. Cl. C09j 1/00; C09d 5/10
U.S. Cl. 117—201                                    11 Claims

ABSTRACT OF THE DISCLOSURE

A resistor comprises a ceramic base and a resistor film adherent to a surface thereof, the charaiteristic feature being that the film is constituted by a composition consisting essentially of 20 to 92% by weight of finely divided CdO and 8 to 80% by weight of glass frit. Frit compositions are disclosed.

---

This invention relates to vitreous enamel resistor compositions which may be applied to and fired on ceramic insulating materials to produce electrical resistors, and to resistors prepared therefrom.

Many attempts have been made heretofore to produce electrical resistors by applying an enamel containing an electrically conductive material onto a ceramic insulator and firing the same to fuse and mature the enamel composition. For example, U.S. Pats. Nos. 2,924,540 and 3,052,573 disclose a good enamel resistor composition comprising finely divided noble metal such as gold, platinum or palladium and finely divided glass frit. However, such enamel resistor composition is expensive though it is superior in the resultant characteristics of resistors prepared therefrom.

It is an object of this invention to provide a vitreous enamel resistor composition comprising no noble metal powder such as gold, platinum, silver and/or palladium.

It is another object of this invention to provide an electrically stable vitreous enamel resistor composition that may be fired in an open air atmosphere on a ceramic insulating base to form an electrical resistor of readily reproducible resistance value.

For a further understanding of the nature and objects of this invention, reference should be had to the following detailed description taken in connection with the accompanying figure of drawing which is a cross-sectional view on a highly exaggerated scale, of a resistor produced in accordance with this invention.

Referring to the drawing, reference numeral 1 designates a ceramic insulating base such as a glass, porcelain, refractory insulating material, aluminum oxide or similar insulating base. Resistor film 2 is of a resistor composition consisting essentially of finely divided CdO powder 3 and glass frit 4 bonding said CdO powder together. Said glass frit 4 also acts as an adhesive to adhere said resistor film 2 firmly to said ceramic base 1 and is prepared by fusing glass frit included in the resistor composition set forth hereinafter.

There have been known various metal oxides which have a low electrical resistance such as $Fe_3O_4$, ZnO with dopant, NiO with a small amount of $Li_2O$, reduced titanium oxide, semiconductive $BaTiO_3$ and $SnO_2$ and $Sb_2O_3$. These metal oxides are apt to react with glass frit or oxygen in air and to lose high electrical conductivity when fired at high temperature in air. On the contrary, CdO powder does not lose high electrical conductivity even when fired in air at a temperature as high as 800° C. with glass frit which includes no alkali metal oxide such as $Li_2O$, $K_2O$ or $Na_2O$.

Said resistor film 2 according to the present invention has a resistor composition consisting essentially of 20 to 92% by weight of CdO and 8 to 80% by weight of glass frit. A lower weight percent of said glass frit results in poorer adherence to ceramic base 1. Lower weight percent of said CdO powder results in higher electrical resistance of resultant resistor film 2 in a given thickness. Perferable resistor composition is 30 to 80% by weight of CdO powder and 20 to 70% by weight of glass frit.

The reduction of electrical resistance of said resistor film in a given weight proportion of CdO powder and glass frit is effected by incorporating, with said CdO powder, less than 1 mole percent of at least one member selected from the group consisting of $Fe_2O_3$, $In_2O_3$, $La_2O_3$ and $Ga_2O_3$.

Since CdO shows an appreciable evaporation above 800° C., the resistor composition according to the present invention should be fired below 800° C. In view of such limitation of firing temperature, the glass frit should fuse below 800° C. in air to bond the CdO powders together and to adhere firmly to the ceramic base. Any glass frit satisfying these requirements and including no alkali metal oxide is operable for the resistor composition according to the present invention. Operable glass frit is borosilicate frit, lead borosilicate frit and zinc leadborate frit.

Most advantageous is lead borosilicate frit in a composition consisting essentially of 50 to 85 wt. percent of PbO, 10 to 25 wt. percent of $B_2O_3$, 5 to 10 wt. percent of $SiO_2$ and 0 to 15 wt. percent of ZnO. Similarly advantageous zinc leadborate frit is in a composition consisting of 55 to 85 wt. percent of PbO, 8 to 25 wt. percent of $B_2O_3$ and 7 to 20 wt. percent of ZnO. A partial substitution of PbF for PbO included in said desirable lead borosilicate frit or said zinc lead borate frit produces a glass frit which fuses at a lower temperature. Operable substitution amount of PbF is 10 to 80 wt. percent of PbF and 20 to 90 wt. percent of PbO.

The glass frit can be prepared in accordance with per se well known glass frit technique. A mixture including desired starting materials is heated at high temperature so as to form a glass frit, and quenched in water. The quenched glass frit is pulverized into powder in a desired particle size by using, for example, a wet ball mill.

Aforesaid resistor film 2 can be prepared by applying a resistor paste including, as solid ingredient, a mixture of CdO powder and glass frit powder in a given composition, to the surface of ceramic base 1 and firing the paste in air at a temperature below 800° C. Said resistor paste can be prepared by dispersing homogeneously a uniform mixture of glass frit powder and CdO powder in a liquid vehicle. The weight proportion of CdO powder to glass frit powder in said mixture is 20 to 92% by weight of CdO and 8 to 80% by weight of glass frit powder and advantageously 30 to 80% by weight of CdO powder and 20 to 70% by weight of glass frit powder.

The liquid vehicle may vary widely in composition. Any inert liquid can be employed for this purpose, for example, water, organic solvents, with or without thickening agents, stabilizing agents, or the like, for example, methyl, ethyl, butyl, propyl or higher alcohols, the corresponding esters such as the carbitol acetates, propionates, etc., the terpenes and liquid resins, for example, pine oil, alpha-terpineol, and the like, and other liquids without limitation, the function of the liquid vehicle being mainly to form a liquid or paste of the desired consistency for application purposes. The liquid vehicles may contain or be composed of volatile liquids to promote fast setting after application, or they may contain waxes, thermoplastic resins such as cellulose acetate butyrate, or wax-like materials which are thermofluid by nature whereby the composition can be applied to a ceramic insulator while at an elevated temperature to set immediately upon contact with the ceramic base.

The amount of said liquid vehicle relative to solid ingredient can vary with the application purpose. For example, in the case of the stencil screen printing method, the operable weight ratio of liquid vehicle to solid ingredient is 10 to 45 wt. percent of liquid vehicle and 55 to 90 wt. percent of solid ingredient. Advantageous weight ratio is 15 to 30 wt. percent of liquid vehicle and 70 to 85 wt. percent of solid ingredient. It is preferable that the viscosity of the resultant paste is 500 to 2,000 poises.

It is important to control the particle size of the CdO powder and glass frit to be incorporated with said vehicle. Advantageous average particle size of CdO powder is 0.05 to 20 microns and advantageous particle size of glass frit is 0.5 to 30 microns.

The resistor paste is applied in a uniform thickness to the ceramic insulating base. This may be done by any application method such as stencil, spray, print, dip or brush method.

The resistor paste applied to the ceramic base is dried, if necessary, to remove solvent from the liquid vehicle and then fired in an electrical furnace at a temperature at which the glass frit fuses so as to bond the CdO powder particles and to adhere firmly to the ceramic base.

The following examples are given to illustrate certain preferred details of the invention, it being understood that the details of the examples are not to be taken as in any way limiting the invention thereto. In all the examples, the particle size of the cadmium oxide and flux average about 0.05 to 5 microns. Although it is desirable to maintain the particle size fairly consistent to obtain good reproducible results, the actual particles sizes are not critical.

EXAMPLE 1

A conventionally prepared glass frit in a composition of 70 wt. percent of PbO, 8 wt. percent of ZnO, 12 wt. percent of $PbF_2$ and 10 wt. percent of $B_2O_3$ is pulverized into an average particle size of 10 microns. The glass frit powder is admixed with CdO powder in an average particle size of 1 micron by using a ball mill. The weight proportion of CdO powder to glass frit is listed in Table 1.

TABLE 1

| Solid ingredient No.: | Weight percent CdO | Weight percent Glass frit | Resistance (kΩ) | Tolerance (percent) |
|---|---|---|---|---|
| 1 | 80 | 20 | 1.67 | ±15 |
| 2 | 70 | 30 | 7.9 | ±18 |
| 3 | 60 | 40 | 36.7 | ±22 |
| 4 | 50 | 50 | 850 | ±30 |

The solid ingredient of Table 1 is mixed well with a liquid vehicle consisting of 20 wt. percent of cellulose acetate butyrate and 80 wt. percent of carbitol acetate to form a resistor paste in a composition consisting of 74 wt. percent of solid ingredient and 26 wt. percent of liquid vehicle.

The resistor paste is applied to an $Al_2O_3$ ceramic plate which has silver paint electrodes applied thereto. The application of paste is carried out by a stainless steel screen stencil in a 200 mesh. The paste applied to the $Al_2O_3$ ceramic plate is fired in air at 500° C. for 20 minutes. The resultant resistor film is in a thickness of about 20 microns and has an area of 4 x 4 mm. Table 1 shows resistance values with tolerance of production.

EXAMPLE 2

A conventionally prepared glass frit in a composition of 74 wt. percent of PbO, 16 wt. percent of $B_2O_3$ and 10 wt. percent of ZnO is pulverized into an average particle size of 10 microns. The glass frit powder is admixed with CdO powder in an average particle size of 1 micron by using a ball mill. The weight proportion of CdO powder to glass frit is listed in Table 2.

The solid ingredient of Table 2 is mixed well with a liquid vehicle consisting of 20 wt. percent of cellulose acetate butyrate and 80 wt. percent of carbitol acetate to form a resistor paste in a composition consisting of 74 wt. percent of solid ingredient and 26 wt. percent of liquid vehicle.

TABLE 2

| Solid ingredient No.: | Weight percent CdO | Weight percent Glass frit | Resistance (kΩ) | Tolerance (percent) |
|---|---|---|---|---|
| 5 | 80 | 20 | 1.35 | ±20 |
| 6 | 75 | 25 | 5.60 | ±23 |
| 7 | 70 | 30 | 18.1 | ±25 |

The resistor paste is applied to an $Al_2O_3$ ceramic plate which has silver paint electrodes applied thereto. The application of paste is carried out by a stainless steel screen stencil in a 200 mesh.

The paste applied to the $Al_2O_3$ ceramic plate is fired in air at 600° C. for 20 minutes. The resultant resistor film is in a thickness of about 20 microns and has an area of 4 x 4 mm. Table 2 shows the resistance values with tolerance of production.

EXAMPLE 3

A conventionally prepared glass frit in a composition of 78 wt. percent of PbO, 15 wt. percent of $B_2O_3$ and 7 wt. percent of $SiO_2$ is pulverized into an average particle size of 10 microns. The glass frit powder is admixed with CdO powder in an average particle size of 1 micron by using a ball mill. The weight proportion is 72 wt. percent of CdO powder and 28 wt. percent of glass frit.

The solid ingredient of this powder is mixed well with a liquid vehicle consisting of 20 wt. percent of cellulose acetate butyrate and 80 wt. percent of carbitol acetate to form a resistor paste in a composition consisting of 74 wt. percent of solid ingredient and 26 wt. percent of liquid vehicle.

The resistor paste is applied to an $Al_2O_3$ ceramic plate which has silver paint electrodes applied thereto. The application of paste is carried out by a stainless steel screen stencil in a 200 mesh. The paste applied to the $Al_2O_3$ ceramic plate is fired in air at 700° C. for 20 minutes. The resultant resistor film is in a thickness of about 20 microns and has an area of 4 x 4 mm. The resistance value is 183 kΩ±22%.

EXAMPLE 4

Cadmium hydroxide with 0.5 mol percent of $Fe_2O_3$, $In_2O_3$, $La_2O_3$ or $Ga_2O_3$ in a finely divided powder form is heated at 500° C. for 1 hour in air to form cadmium oxide incorporated with said additive. The resultant cadmium oxide has an average particle size ranging from 0.1 to 5 microns. The glass frit powder used in Example 1 is well mixed with the said CdO powder in a weight proportion of 60 weight percent of CdO and 40 weight percent of glass frit powder. The mixture is incorporated with the liquid vehicle of Example 1 in a weight proportion similar to that of Example 1 to form a resistor paste. The resistor paste is applied to an $Al_2O_3$ ceramic base which has silver paint electrodes applied thereto and fired in air at 500° C. for 20 minutes in a manner similar to that of Example 1. The resultant resistor film is in a thickness of about 20 microns and has an area of 4 x 4 mm. Table 3 shows resistance values with tolerance.

TABLE 3

| Solid ingredient No.: | Additives | Resistance (kΩ) | Tolerance (percent) |
|---|---|---|---|
| 8 | $Fe_2O_3$ | 15.4 | ±18 |
| 9 | $In_2O_3$ | 12.8 | ±16 |
| 10 | $La_2O_3$ | 19.3 | ±22 |
| 11 | $Ga_2O_3$ | 20.3 | ±24 |

What is claimed is:

1. A resistor composition adapted for resistor film applied to ceramic base consisting essentially of 20 to 92% by weight of finely divided CdO and 8 to 80% by weight of glass frit.

2. A resistor composition as defined by claim 1, wherein said composition consists essentially of 30 to 80% by weight of finely divided CdO and 20 to 70% by weight of glass frit.

3. A resistor composition as defined by claim 1, wherein said glass frit is of a composition consisting essentially of 50 to 85% by weight of PbO, 10 to 25% by weight of $B_2O_3$, 5 to 10% by weight of $SiO_2$ and 0 to 15% by weight of nZO.

4. A resistor composition as defined by claim 1, wherein said glass frit is of a composition consisting essentially of 55 to 85 wt. percent of PbO, 8 to 25 wt. percent of $B_2O_3$ and 7 to 20 wt. percent of ZnO.

5. A resistor composition as defined by claim 3 wherein said PbO is partially replaced with PbF in a weight ratio of 10 to 80 wt. percent of PbF to 20 to 90 wt. percent of PbO.

6. A resistor composition as defined by claim 4 wherein said PbO is partially replaced with PbF in a weight ratio of 10 to 80 wt. percent of PbF to 20 to 90 wt. percent of PbO.

7. A resistor composition as defined by claim 1, wherein said finely divided CdO is incorporated with less than 1 mol percent of at least one member selected from the group consisting of $Fe_2O_3$, $In_2O_3$, $La_2O_3$ and $Ga_2O_3$.

8. A resistor paste comprising, as a solid ingredient, 55 to 90% by weight of a mixture consisting essentially of 20 to 92% by weight of finely divided CdO and 8 to 80% by weight of finely divided glass frit and 10 to 45% by weight of liquid vehicle.

9. A resistor paste as defined by claim 8, wherein a proportion of said mixture to said liquid vehicle is 70 to 85% by weight of said mixture and 15 to 30% by weight of said liquid vehicle.

10. A resistor paste defined by claim 9, wherein said mixture is of a composition consisting essentially of 30 to 80% by weight of finely divided CdO and 20 to 70% by weight of finely divided glass frit.

11. A resistor comprising a ceramic base and a resistor film adhered to a surface of said ceramic base, said resistor film being of a composition consisting essentially of 20 to 92% by weight of finely divided CdO and 8 to 80% by weight of glass frit.

References Cited
UNITED STATES PATENTS 3,494,789　2/1970　Makino et al. _____ 117—201

WILLIAM L. JARVIS, Primary Examiner

U.S. Cl. X.R.

117—169; 252—518; 338—308